(12) United States Patent
Sorani et al.

(10) Patent No.: US 12,741,604 B2
(45) Date of Patent: Sep. 22, 2026

(54) POWER SUPPLY AND DISTRIBUTION SYSTEM FOR AN ELECTRIC VEHICLE AND A METHOD FOR OPERATING A POWER SUPPLY SYSTEM FOR AN ELECTRIC VEHICLE

(71) Applicants: Ningbo Geely Automobile Research & Development Co., Ltd., Ningbo (CN); Zhejiang Geely Holding Group Co., Ltd., Zhejiang (CN)

(72) Inventors: Heza Sorani, Västra Frölunda (SE); Fehmi Fetiu, Gothenburg (SE); Nils Höglund, Gothenburg (SE); Linus Franzén, Hyssna (SE)

(73) Assignees: NINGBO GEELY AUTOMOBILE RESEARCH & DEVELOPMENT CO., LTD., Ningbo (CN); ZHEJIANG GEELY HOLDING GROUP CO., LTD., Zhejiang (CN)

( * ) Notice: Subject to any disclaimer, the term of this patent is extended or adjusted under 35 U.S.C. 154(b) by 0 days.

(21) Appl. No.: 18/962,843

(22) Filed: Nov. 27, 2024

(65) Prior Publication Data

US 2025/0091537 A1 Mar. 20, 2025

Related U.S. Application Data

(63) Continuation of application No. PCT/CN2023/096886, filed on May 29, 2023.

(30) Foreign Application Priority Data

May 31, 2022 (EP) .................................... 22176438

(51) Int. Cl.
*B60R 16/03* (2006.01)
*B60L 50/60* (2019.01)
(Continued)

(52) U.S. Cl.
CPC ............ *B60R 16/033* (2013.01); *B60L 50/60* (2019.02); *B60R 16/023* (2013.01); *B60L 2210/12* (2013.01)

(58) Field of Classification Search
CPC ..... B60R 16/033; B60R 16/023; B60L 50/60; B60L 2210/12; H02J 9/061; H02J 2310/46; H02J 1/10
(Continued)

(56) References Cited

U.S. PATENT DOCUMENTS 5,654,859 A * 8/1997 Shi ............................ H02J 9/00 361/100
2016/0109212 A1* 4/2016 Bader .................... H02H 3/087 102/275.9
(Continued)

FOREIGN PATENT DOCUMENTS

DE 102013225020 A1 * 6/2015 ................ H02J 1/08
DE 102016210153 A1 12/2017
(Continued)

OTHER PUBLICATIONS

International Search Report from corresponding International Application No. PCT/CN2023/096886, mailed on Aug. 25, 2023, 2 pages.

*Primary Examiner* — Elim Ortiz
(74) *Attorney, Agent, or Firm* — Tucker Ellis LLP

(57) ABSTRACT

A power supply and distribution system for an electric vehicle includes: a High Voltage power source connected to a first DC-DC converter and a second DC-DC converter, each of the first DC-DC converter and the second DC-DC converter producing Low Voltage DC to a first primary power supply line for a first group of critical low voltage equipment and a second primary power supply line for a second group of critical low voltage equipment, respectively; wherein the first primary power supply line and the second primary power supply line are connected in parallel
(Continued)

to Variable Electrical Loads via a dual back-to-back switch unit, the dual back-to-back switch comprising a first back-to-back switch and a second back-to-back switch each individually controlled by at least a first microcontroller unit.

9 Claims, 2 Drawing Sheets

(51) Int. Cl.
*B60R 16/023* (2006.01)
*B60R 16/033* (2006.01)
*H02J 1/10* (2026.01)

(58) Field of Classification Search
USPC .... 307/9.1, 10.1, 66, 64, 80, 23, 43, 65, 82, 307/85, 86, 57; 701/66, 36; 713/300; 320/109, 104, 134; 318/139; 180/65.1
See application file for complete search history.

(56) References Cited

U.S. PATENT DOCUMENTS

2018/0229609 A1 8/2018 Hudson et al.
2019/0256018 A1 8/2019 Taoka et al.
2021/0370831 A1* 12/2021 Kim .......................... B60R 1/24

FOREIGN PATENT DOCUMENTS

WO 2020256858 A1 12/2020
WO 2021075408 A1 4/2021

* cited by examiner 1
2
4
5
SW
SW1
SW2
MCU1
MCU2
PS1
PS2
9
VEL

POWER SUPPLY AND DISTRIBUTION SYSTEM FOR AN ELECTRIC VEHICLE AND A METHOD FOR OPERATING A POWER SUPPLY SYSTEM FOR AN ELECTRIC VEHICLE

REPLATED APPLICATION DATA

This application is a continuation of International Patent Application No. PCT/CN2023/096886, filed May 29, 2023, and claims the benefit of European Patent Application No. 22176438.4, filed May 31, 2022, the disclosures of which are incorporated herein by reference in their entireties.

TECHNICAL FIELD

The present disclosure relates to a power supply and distribution system for an electric vehicle and a method for operating a power supply system for an electric vehicle.

BACKGROUND

In all electrical and conventional vehicles, the electrical ECUs and components, including 12V battery charging, are either powered from the 12V alternator or a DC-DC converter which convert power from a high voltage side (800/400/48V) to the low voltage side (12V). Both the alternator and the DCDC will always have be rated to a maximum power output. Since the automotive industry and almost all OEM's are moving towards increasing electrification of vehicles this will increase the number of electrical components in each vehicle. This means an increased current consumption and higher request of power from the power supply system. In addition, self-driving systems or Advanced Driver Assistance Systems (ADAS) of different levels are being introduced to the marked increasing the demand of high DCDC performance and power availability. If the DCDC capacity rate is not sufficient, this will result in drainage of the 12V battery during driving resulting in reduced life time and even in worst case loss of functionality if battery is totally depleted.

The 12V battery in modern electrical vehicles is only used during parking when the DCDC is off (to entertain the convenience loads); during start up the vehicle and during a failure of the DCDC to ensure a safe stop.

The dimensioning of the DCDC power rate capacity is always limited by the size (packaging affected/limited available place) and cost. Additionally, the capacity of the DCDC should be capable of ensuring and cover all electrical load consumption during driving at different climate conditions.

There is thus a need in the industry for better power supply systems for vehicle that increase safety while reducing the need for over-dimensioned and expensive DC-DC converters.

SUMMARY

It is an object of the present disclosure to mitigate, alleviate or eliminate one or more of the above-identified deficiencies and disadvantages in the prior art and solve at least the above mentioned problem.

According to a first aspect there is provided a power supply and distribution system for an electric vehicle, comprising: a High Voltage power source connected to a first DC-DC converter and a second DC-DC converter, each of the first DC-DC converter and the second DC-DC converter producing Low Voltage DC to a first primary power supply line for a first group of critical low voltage equipment and a second primary power supply line for a second group of critical low voltage equipment, respectively; wherein the first primary power supply line and the second primary power supply line are connected in parallel to Variable Electrical Loads via a dual back-to-back switch unit, the dual back-to-back switch comprising a first back-to-back switch and a second back-to-back switch each individually controlled by at least a first microcontroller unit.

An advantage with this embodiment is that the Variable Electrical Loads, consisting of low voltage equipment not safety critical for the vehicle, are gathered to their own busbar that can be disengaged in case of power shortage e.g. due to a partial battery failure so that remaining power can be used for safety critical low voltage equipment connected to the first primary power supply line and the second primary power supply line. The maximum rating of the DC-DC converters can thereby also be reduced. This in turn will reduce cost and weight of the vehicle which also reduces the environmental foot print for the production of the vehicle.

The dual back-to-back switch can, however, be made of any back-to-back switch consisting of a connection of two identical or similar components in series to facilitate a higher fail safety. The simplest back to back switch can be made by two simple electromechanical on-off switches in series, while a very fast and more advanced back-to-back switch can be made by two MOFET in series back-to-back. The first back-to-back switch and the second back-to-back switch can be constructed in a vast number of ways to accomplish the fail safety just described. However, for the concept of the herein presented disclosure, any back-to-back switch suitable for the power rating of the electric vehicle power supply and distribution system can be used for the first back-to-back switch and the second back-to-back switch as long as they are possible to control by the at least first microcontroller unit.

According to some embodiments, the at least first microcontroller unit receives input from a Central Electronic Unit and/or a Vehicle Control Unit regarding the state of the power supply availability of the first primary power supply line and the second primary power supply line, respectively.

The maximum rating of the DC-DC converters can thereby also be reduced as the Variable Electrical Loads can at every point in time be connected to the DC-DC converter that has capacity. Prior art load control cannot execute load control in a controlled and fast enough way. They can only request minor electrical loads to limit their current consumption and functionality. It is hard to judge if the limitation succeeds successfully and complete disable of the loads is not possible. Existing prior art solutions load reduction are not able to provide the power availability to the critical loads nor handle the dual power supply system in a sufficient way.

The here disclosed solution, however, can move those variable electrical loads' current consumption easily between the two power supply lines depending on power availability from the DCDCs. This will result in sufficient power balancing at the system and better control. In such bad situation as electrical failures, by reducing the Variable Electric Loads from the defected power line or by disconnecting them, this will leave more power capacity from the DCDC to power the more critical and safety related electrical loads as self-driving system, braking and steering functionality which are depending on electrical power and energy only.

According to some embodiments, comprises a second microcontroller unit, wherein that the first back-to-back switch is controlled by the at least first microcontroller unit and the second back-to-back switch is controlled by the second microcontroller unit.

An advantage with this solution is that the redundancy of the power supply and distribution system is even higher as the first back-to-back switch and the second back-to-back switch are individually controlled. This will result in higher Automotive Safety Integrity Level (ASIL) classification.

According to some embodiments, the first microcontroller unit and the second microcontroller unit are built in the dual back-to-back switch unit.

This has the advantage of a more rugged and robust power supply and distribution system reducing the number of components. A reduced number of components also makes the vehicle easier to assemble, saving time, costs and the environment.

According to some embodiments, the first back-to-back switch and the second back-to-back switch in the dual back-to-back switch are arranged to fulfil high ASIL classification.

According to a second aspect there is provided a method for operating a power supply system for an electric vehicle according to the first aspect, comprising the step of: balancing, at the at least first microcontroller unit, the load of the Variable Electrical Loads between the first primary power supply line and the second primary power supply line. In that way the maximum rating of the DC-DC converters can be reduced, which in turn will reduce cost and weight of the vehicle which also reduces the environmental foot print for the production of the vehicle.

According to some embodiments, the method comprises the step of: calculating, at the at least first microcontroller unit, the power availability from the first DC-DC converter and the second DC-DC converter and control the first back-to-back switch and the second back-to-back switch based on the respective calculated availability of power. An advantage with tis embodiment is that the optimization of power resources is further increased. The maximum rating of the DC-DC converters can be reduced, which in turn will reduce cost and weight of the vehicle which also reduces the environmental foot print for the production of the vehicle.

According to some embodiments, the method comprises the step of: controlling, at the at least first microcontroller unit, that the first back-to-back switch and the second back-to-back switch are not closed at the same time. An advantage is that short circuits are avoided in the system.

According to some embodiments, the method comprises the step of: disconnecting, in case of failure of the first primary power supply line or the second primary power supply line, the Variable Electrical Loads from the failing primary power supply line. An advantage with this is that load optimization is so that safety critical equipment will be able to use any remaining power from the failing power supply line.

According to some embodiments, the at least first microcontroller unit is arranged to in case of failure of the first primary power supply line and/or the second primary power supply line, disconnecting the Variable Electrical Loads from the first primary power supply line and the second primary power supply line. An advantage with this embodiment is that power is cut completely to the Variable Electrical Loads so that the safety critical equipment will be able to use any remaining power from the failing first primary power supply line and/or the failing second primary power supply line.

Effects and features of the second aspect are to a large extent analogous to those described above in connection with the first aspect. Embodiments mentioned in relation to the first aspect are largely compatible with the second aspect.

The present disclosure will become apparent from the detailed description given below. The detailed description and specific examples disclose preferred embodiments of the disclosure by way of illustration only. Those skilled in the art understand from guidance in the detailed description that changes and modifications may be made within the scope of the disclosure.

Hence, it is to be understood that the herein disclosed disclosure is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claims, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above objects, as well as additional objects, features and advantages of the present disclosure, will be more fully appreciated by reference to the following illustrative and non-limiting detailed description of example embodiments of the present disclosure, when taken in conjunction with the accompanying drawings.

DETAILED DESCRIPTION OF EXAMPLE EMBODIMENTS

The present disclosure will now be described with reference to the accompanying drawings, in which preferred example embodiments of the disclosure are shown. The disclosure may, however, be embodied in other forms and should not be construed as limited to the herein disclosed embodiments. The disclosed embodiments are provided to fully convey the scope of the disclosure to the skilled person.

Figure 1:
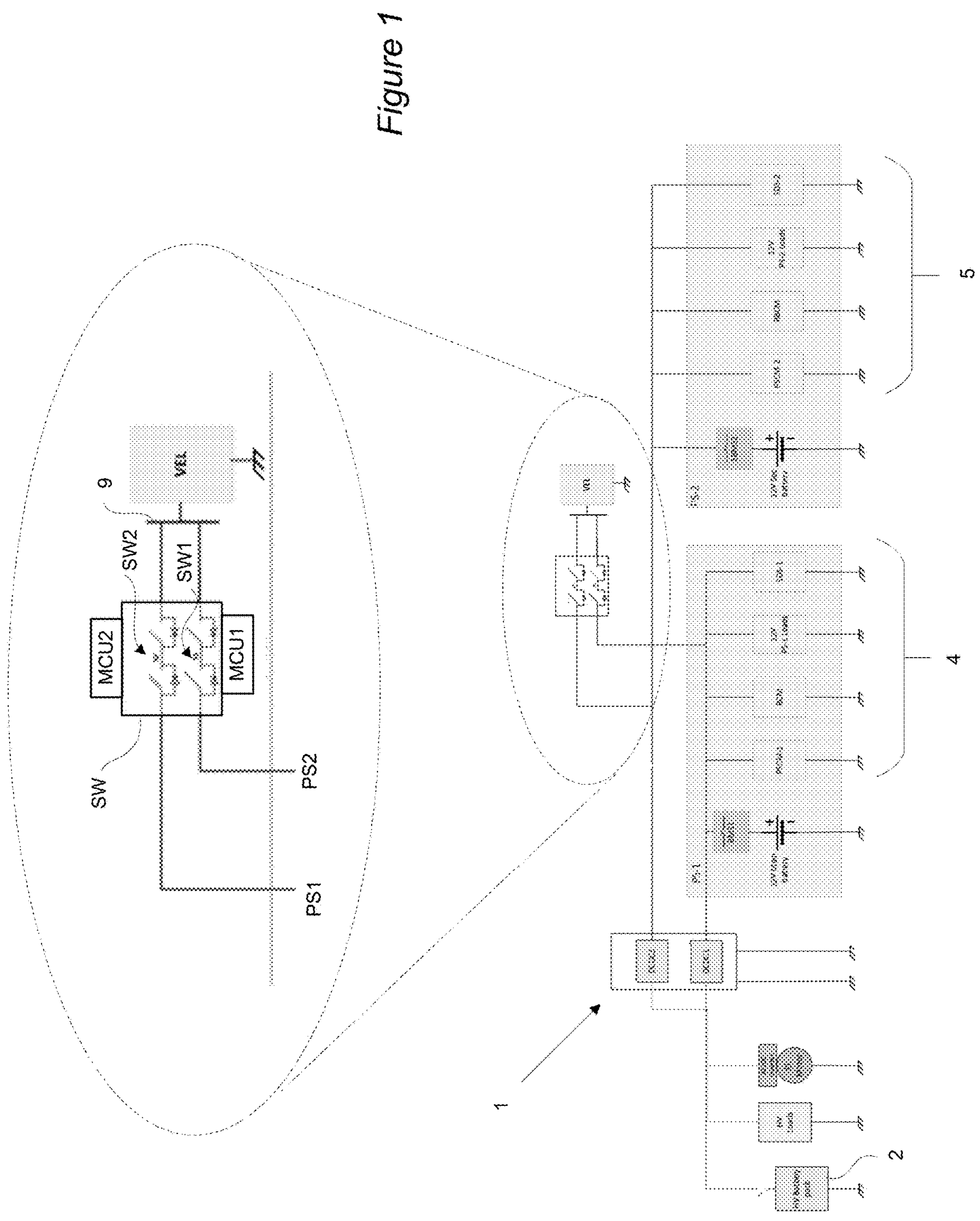
FIG. 1 shows a layout of a power supply system according the prior art.
Figure 2:
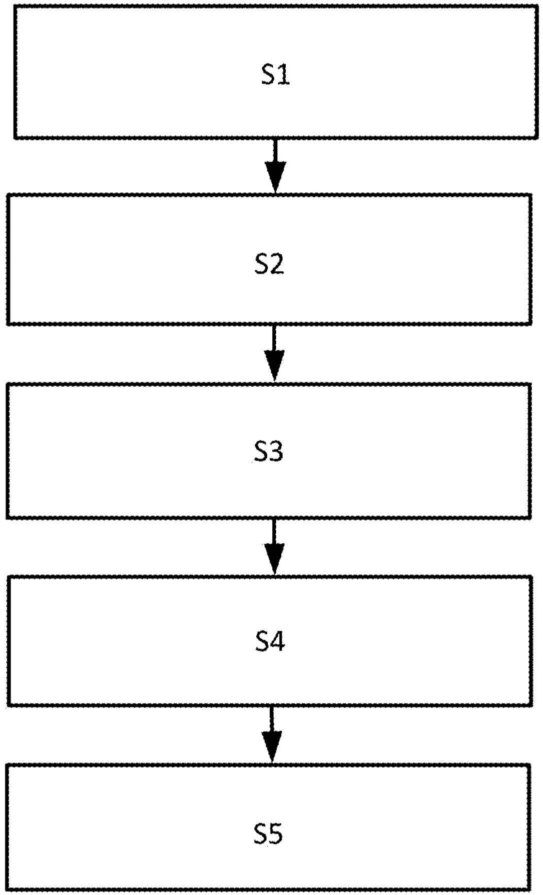
FIG. 2 is a block diagram showing a method according to the present disclosure.

The first aspect of this disclosure, shown in FIG. 1, discloses a power supply and distribution system 1 for an electric vehicle. The power supply and distribution system comprises a High Voltage power source 2 connected to a first DC-DC converter DCDC1 and a second DC-DC converter DCDC2, each of the first DC-DC converter DCDC2 and the second DC-DC converter DCDC2 producing Low Voltage DC to a first primary power supply line PS1 for a first group of critical low voltage equipment 5 and a second primary power supply line PS2 for a second group of critical low voltage equipment 6, respectively. The first primary power supply line PS1 and the second primary power supply line PS2 are connected in parallel to Variable Electrical Loads VEL via a dual back-to-back switch unit SW. The dual back-to-back switch SW comprising a first back-to-back switch SW1 and a second back-to-back switch SW2 each individually controlled by at least a first microcontroller unit MCU1.

In FIG. 1 the first back-to-back switch SW1 and the second back-to-back switch SW2 are constructed by an on-off switch in parallel with a diode connected in series with an identical on-off switch in parallel with a diode, connected back-to-back (the diodes in opposite directions). The dual back-to-back switch can, however, be made of any back-to-back switch consisting of a connection of two identical or similar switching components in series to facilitate a switch with higher fail safety. The simplest back to back switch can be made by two simple electromechanical on-off switches in series, while a very fast and more advanced back-to-back switch can be made by two MOFET in series back-to-back. The first back-to-back switch SW1 and the second back-to-back switch SW2 can be constructed in a vast number of ways to accomplish the fail safety just described. However, for the concept of the herein presented disclosure, any back-to-back switch suitable for the power rating of the electric vehicle power supply and distribution system can be used for the first back-to-back switch SW1 and the second back-to-back switch SW2 as long as they are possible to control by the at least first microcontroller unit MCU1.

As disclosed in FIG. 1 in the enlarged ellipse the Variable Electrical Loads, consisting of low voltage equipment not safety critical for the vehicle, are gathered to their own busbar 9 that can be disengaged in case of power shortage e.g. due to a partial battery failure so that remaining power can be used for safety critical low voltage equipment connected to the first primary power supply line and the second primary power supply line. The maximum rating of the DC-DC converters can thereby also be reduced. This in turn will reduce cost and weight of the vehicle which also reduces the environmental foot print for the production of the vehicle. As further seen in FIG. 1 each of the first primary power supply line PS1 and the second primary power supply line PS2 has a 12V backup battery in case of failure of the power source. The first primary power supply line PS1 and the second primary power supply line PS2 supply the low voltage equipment that is critical for driving the vehicle, while non-critical low voltage equipment is connected to the busbar 9 of the Variable Electrical Loads.

The at least first microcontroller unit MCU1 receives input from a Central Electronic Unit and/or a Vehicle Control Unit regarding the state of the power supply availability of the first primary power supply line PS1 and the second primary power supply line PS2, respectively.

The power supply and distribution system 1 further comprises a second microcontroller unit MCU2, wherein that the first back-to-back switch SW1 and the second back-to-back switch SW2 are controlled by the at least first microcontroller unit MCU1.

In FIG. 1 the first microcontroller unit and the second microcontroller unit are built in the dual back-to-back switch unit SW. It makes the dual back-to-back switch unit SW quicker and the power supply and distribution system becomes more robust. All switching logics can be implemented into the dual back-to-back switch unit SW. This includes the power supply availability and other important data can be direct informed to the unit from the first primary power supply line PS1 and the second primary power supply line PS2 for improved control of the first back-to-back switch SW1 and the second back-to-back switch SW2.

The first back-to-back switch SW1 and the second back-to-back switch SW2 in the dual back-to-back switch SW fulfil high ASIL classification, e.g. by constructing the first back-to-back switch SW1 and the second back-to-back switch SW2, as disclosed in FIG. 1, using an on-off switch in parallel with a diode connected in series with an identical on-off switch in parallel with a diode, the diodes being directed in opposite directions (i.e. back-to-back). Each of the first back-to-back switch SW1 and the second back-to-back switch SW2 could, however also, as a second example be constructed by two MOSFET components connected back-to-back.

The second aspect of this disclosure shows a method for operating a power supply system 1 for an electric vehicle according to the first aspect, comprising the step of: balancing S1, at the at least first microcontroller unit MCU1, the load of the Variable Electrical Loads VEL between the first primary power supply line PS1 and the second primary power supply line PS2. The Variable Electrical Loads VEL can thereby at all times be connected to power supply lines having the most excess capacity.

The method further comprises the step of: calculating S2, at the at least first microcontroller unit MCU1, the power availability from the first DC-DC converter DCDC1 and the second DC-DC converter DCDC2 and control the first back-to-back switch SW1 and the second back-to-back switch SW2 based on the respective calculated availability of power. If e.g. an Advanced Driver Assistance System is running on the first primary power supply line PS1 so that the first primary power supply line PS1 has less excess power than the second primary power supply line PS2, the Variable Electrical Loads VEL will be connected to the second primary power supply line PS2 by the power supply and distribution system.

The method further comprises the step of: controlling S3, at the at least first microcontroller unit MCU1, that the first back-to-back switch SW1 and the second back-to-back switch SW2 are not closed at the same time. A short circuit is thereby avoided.

The method further comprises the step of: disconnecting S4, in case of failure of the first primary power supply line PS1 or the second primary power supply line PS2, the Variable Electrical Loads VEL from the failing primary power supply line. The safety critical equipment of the failing primary power supply line will thereby get access to all available electricity not having to compete with the Variable Electrical Loads VEL.

The at least first microcontroller unit MCU1 is arranged to in case of failure of the first primary power supply line PS1 and/or the second primary power supply line PS2, disconnecting S5 the Variable Electrical Loads VEL from the first primary power supply line PS1 and the second primary power supply line PS2. As the Variable Electrical Loads VEL are not critical for driving the vehicle, any remaining power will be saved for equipment needed to drive the vehicle to the side of the road or to a safe place in traffic or away from traffic.

The person skilled in the art realizes that the present disclosure is not limited to the preferred embodiments described above. The person skilled in the art further realizes that modifications and variations are possible within the scope of the appended claims. For example, the skilled person realizes that the invention could be extended with a third primary power supply line and a triple back-to-back switch for even more fail safety. Additionally, variations to the disclosed embodiments can be understood and effected by the skilled person in practicing the disclosure, from a study of the drawings, the disclosure, and the appended claims.

What is claimed is:

1. A power supply and distribution system for an electric vehicle, comprising:

a High Voltage power source connected to a first DC-DC converter and a second DC-DC converter, each of the first DC-DC converter and the second DC-DC converter producing Low Voltage DC to a first primary power supply line for a first group of critical low voltage equipment and a second primary power supply line for a second group of critical low voltage equipment, respectively;

wherein the first primary power supply line and the second primary power supply line are connected in parallel to Variable Electrical Loads via a dual back-to-back switch unit, the dual back-to-back switch comprising a first back-to-back switch and a second back-to-back switch each individually controlled by at least a first microcontroller unit; and wherein the at least first microcontroller unit receives input from a Central Electronic Unit and/or a Vehicle Control Unit regarding the state of the power supply availability of the first primary power supply line and the second primary power supply line, respectively.

2. The power supply system according to claim 1, further comprises a second microcontroller unit, wherein that the first back-to-back switch and the second back-to-back switch are controlled by the at least first microcontroller unit.

3. The power supply system according to claim 1, wherein the first microcontroller unit and the second microcontroller unit are built in the dual back-to-back switch unit.

4. The power supply system according to claim 1, wherein the first back-to-back switch and the second back-to-back switch in the dual back-to-back switch fulfil high ASIL classification.

5. A method for operating the power supply system for the electric vehicle according to claim 1, comprising the step of:

balancing, at the at least first microcontroller unit, the load of the Variable Electrical Loads between the first primary power supply line and the second primary power supply line.

6. The method for operating the power supply system according to claim 5, further comprising the step of:

calculating, at the at least first microcontroller unit, the power availability from the first DC-DC converter and the second DC-DC converter and control the first back-to-back switch and the second back-to-back switch based on the respective calculated availability of power.

7. The method for operating the power supply system according to claim 5, further comprising the step of:

controlling, at the at least first microcontroller unit, that the first back-to-back switch and the second back-to-back switch are not closed at the same time.

8. The method for operating the power supply system according to claim 5, further comprising the step of:

disconnecting, in case of failure of the first primary power supply line or the second primary power supply line, the Variable Electrical Loads from the failing primary power supply line.

9. The method for operating the power supply system according to claim 8, wherein the at least first microcontroller unit is arranged to in case of failure of the first primary power supply line and/or the second primary power supply line, disconnecting the Variable Electrical Loads from the first primary power supply line and the second primary power supply line.

* * * * *